Oct. 8, 1929.         J. E. ESHBAUGH         1,731,214
THERMOSTAT
Filed May 7, 1928
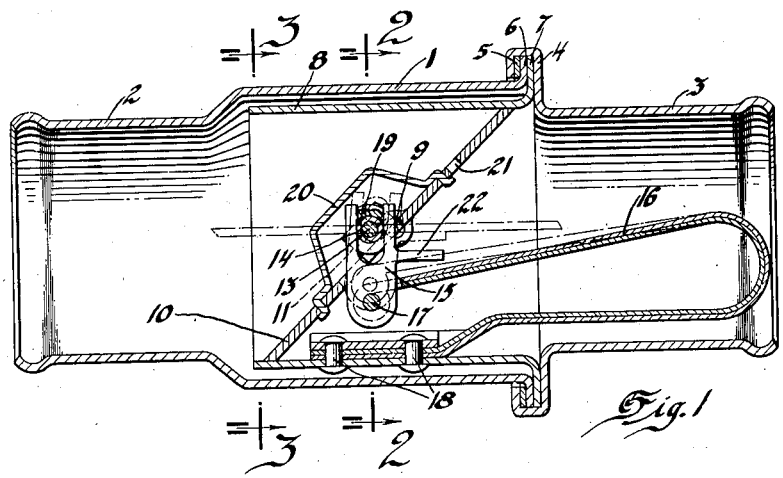
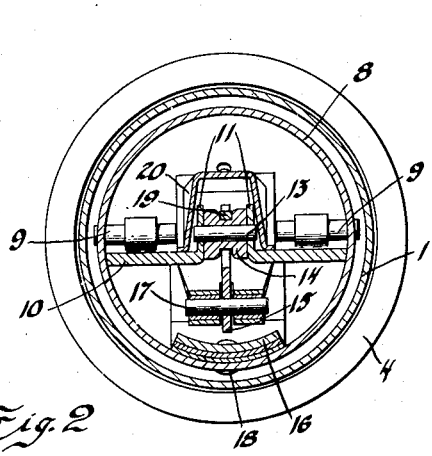
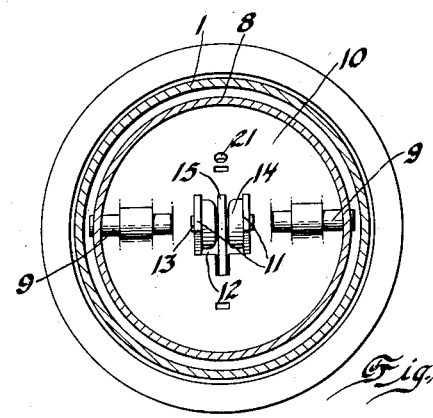
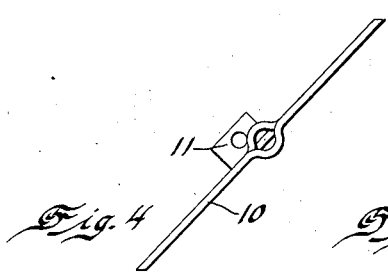
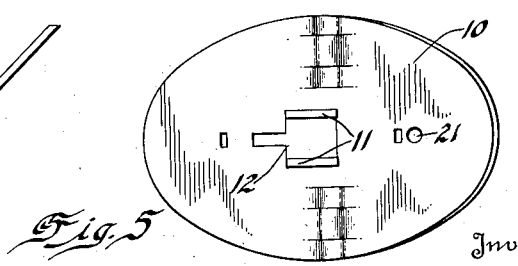
Inventor
Jesse E. Eshbaugh
By Blackmore, Spencer & Finch
Attorneys Patented Oct. 8, 1929

1,731,214

UNITED STATES PATENT OFFICE

JESSE E. ESHBAUGH, OF FLINT, MICHIGAN, ASSIGNOR TO A C SPARK PLUG COMPANY, OF FLINT, MICHIGAN, A COMPANY OF MICHIGAN

THERMOSTAT

Application filed May 7, 1928. Serial No. 275,705.

This invention relates to automatically operated valves, and more particularly to an improvement in temperature control valves, such as are commonly employed in the circulatory cooling systems of internal combustion engines for motor vehicles. The invention contemplates the placing of a valve between the outlet of the engine water jacket and cooling radiator to cut off the flow of cooling liquid when the engine is cold, so as to enable the liquid in the engine jacket to warm up quickly to the proper temperature necessary for efficient engine operation, and which will automatically open with the increase in temperature, to allow circulation through the system to prevent overheating.

It is an object of the invention to provide an improved type of thermo-sensitive control element that may be located in the liquid stream, so that the temperature of the flowing liquid may act directly thereon.

It is a further object of the invention to provide an improved motion transmitting connection between the valve and thermo-sensitive element that will permit the proper relation of the parts to be readily and quickly effected, depending upon the conditions or use, and the characteristics of the engine with which it is to be used.

Another object of the invention is to provide a unit that may be installed either as an accessory on existing vehicles, or as standard equipment on new cars, which will be extremely simple in design, economical in manufacture, compact in assembly, accurate in use, and unlikely to get out of order.

Other objects and advantages will be apparent from the following specification taken in connection with the accompanying drawing, illustrating a preferred embodiment of the invention, and in which Fig. 1 is a longitudinal sectional view of the thermostatically operated valve unit.

Fig. 2 is a transverse sectional view taken on line 2—2 of Fig. 1.

Fig. 3 is a transverse sectional view taken on line 3—3 of Fig. 1, with certain parts omitted.

Figs. 4 and 5 are detail side elevation and plan views, respectively, of the valve.

Referring to the drawing, the reference numeral 1 indicates a tubular or cylindrical casing or housing, having a neck or extension 2, at one end for clamping thereon of a hose connection, or the like, that may lead to the cooling radiator. A similar hose leading from the engine water jacket may be clamped on the extension or neck 3, which is provided at its end with an out-turned flange 4, bent or spun over a gasket or washer 5, an annular flange 6 on the casing 1, and an annular flange 7 of an inner cylindrical casing or cage 8, to afford a rigid connection and a leak-proof joint between the parts. Pivotally mounted for swinging movement upon a pair of studs or shafts 9 in the inner casing or cage 8, is a plate or disc valve element 10, that has a pair of upstanding ears 11 struck up at the center thereof, leaving an opening 12 therein. Positioned between the ears 11 and rotatably mounted upon a pin or stud 13 is a hub member 14 having an annular groove or depression intermediate its ends, into which groove extends the forks or prongs of a bifurcated link member 15, projecting within a slot in the end of the thermo-sensitive element 16 and pivoted upon a pin 17 carried in an eye formed at the end of the element 16. The thermostat 16 consists of a bi-metallic strip looped or formed into U shape, and extending longitudinally of the casing, directly in the path of the liquid flow, and having one end fixedly secured, as by rivets 18, to the wall of the cage or inner casing 8.

When the parts are being assembled the bifurcated end of the link 15 is caused to loosely straddle the hub member 14, in which position it may be moved relative to the hub upon the expansion of the looped thermostat or bi-metallic strip. In order to fixedly secure or connect the link and hub with each other, so that when in use the valve will begin to swing open under the influence of the thermostat expansion when the predetermined temperature of the liquid in the engine jacket is reached, the device may be submerged in water of a temperature agreeing with that at which it is desired to have the valve open; the position to which the link will then adjust itself, relative to the hub, may be fixed by soldering these parts to each other, as at 19. Accuracy of the device is thus insured. The parts may be otherwise fixedly connected, but the use of solder is especially suited for the purpose, because of the ease and speed of application and, also, because of its comparative cheapness.

After the connection is made, a cap or cover 20 is secured over the upstanding ears 11, to close the opening 12 in the valve, and prevent the flow of liquid therethrough when the valve is closed. A port 21 is provided in the valve, as is customary, for leakage. If desired, the cover 20 may be omitted, in which event the port 21 need not be provided, since the clearance space between the parts at the opening 12 will permit the desired leakage.

In operation, the expansion or contraction of the looped thermostat will push or pull on the link to swing the valve to open or closed positions. In its open position, shown by dotted lines in Figure 1, the valve abuts or rests upon a lateral projection or stop finger 22 formed on the link 15.

The arrangement of the inner and outer concentric casings is of especial advantage in that the thermostat and valve may be connected by the inner casing without any harm from leakage occurring at the shaft bearings or rivet holes and, also, in the fact that the need for great care and accuracy in manufacture is eliminated. It will be understood that, if it is desired, the inner casing or cage can be positioned directly in the outlet of the engine jacket and, in such event, the outer casing would be omitted.

While but one specific embodiment of the invention has been illustrated and described, it is to be understood that the invention is not limited to the exact details and that such modifications may be made as come within the scope of the appended claims.

I claim:

1. A tubular casing, a cage concentrically positioned therein for the flow of liquid therethrough, a pivoted valve carried by the cage to control liquid flow, a U-shaped bi-metallic strip carried by the cage in the liquid stream, a link pivoted to the strip, and an element pivotally carried by the valve with which the link is fixedly secured when the strip and valve are brought into predetermined relation.

2. A casing member through which liquid may flow, a swinging valve element controlling liquid flow through the casing, a thermo-sensitive element located in the liquid stream, and an operating connection between the valve and thermo-sensitive element including a fixed joint that is made after the elements are brought into a relation wherein the valve will open when the thermo-sensitive element is subjected to a predetermined temperature.

3. A tubular casing, a swinging valve element, and a thermo-sensitive element located within the casing and a pair of members pivotally carried by said elements respectively, and adapted to be fixedly secured to each other for connecting the valve and thermo-sensitive element in a definite relation when the thermo-sensitive element is subjected to a predetermined temperature.

4. A tubular casing, a swinging valve element and a thermo-sensitive element located within the casing, a hub pivotally carried by one of the elements and a link pivotally carried by the other element, said hub and link being adapted to be soldered together to hold the valve in a definite position with regard to the position of the thermo-sensitive element at a predetermined temperature.

5. A tubular casing, a swinging valve element and a thermo-sensitive element located within the casing, a hub pivotally carried by one of the elements and a bifurcated link pivoted to the other element and straddling said hub, said link and hub being adapted to be fixedly secured to each other.

6. A tubular casing, a swinging valve pivotally mounted therein, a thermo-sensitive element in the casing, an operative link connecting the valve and thermo-sensitive element and a stop member on the link for limiting the movement of the valve in one direction.

7. A tubular casing, a cage secured in the casing, a U-shaped bi-metallic thermo-sensitive strip mounted in said cage and extending longitudinally within the casing, a disc valve pivotally mounted in said cage and having a pair of upstanding ears formed thereon, a hub element pivotally mounted on said ears, a link pivotally connected with said thermo-sensitive strip and having a bifurcated end portion straddling said hub, and means to secure the hub and link consisting of a solder connection made when the thermo-sensitive strip is subjected to a predetermined temperature, and a lateral arm on said link forming a stop for the valve when the valve is moved to open position.

In testimony whereof I affix my signature.

JESSE E. ESHBAUGH.